US 11,994,113 B2

(12) United States Patent
Pedersen et al.

(10) Patent No.: US 11,994,113 B2
(45) Date of Patent: May 28, 2024

(54) FLUID SYSTEM FOR A WIND TURBINE (71) Applicant: Vestas Wind Systems A/S, Aarhus (DK)

(72) Inventors: Jan Hove Pedersen, Risskov (DK); Thomas Korsgaard Nielsen, Vejle (DK); Morten Aalbæk Kristensen, Hjerm (DK)

(73) Assignee: Vestas Wind Systems A/S, Aarhus (DK)

( * ) Notice: Subject to any disclaimer, the term of this patent is extended or adjusted under 35 U.S.C. 154(b) by 495 days.

(21) Appl. No.: 16/973,062

(22) PCT Filed: May 29, 2019

(86) PCT No.: PCT/DK2019/050171
§ 371 (c)(1),
(2) Date: Dec. 8, 2020

(87) PCT Pub. No.: WO2019/242820
PCT Pub. Date: Dec. 26, 2019

(65) Prior Publication Data
US 2021/0270249 A1    Sep. 2, 2021

(30) Foreign Application Priority Data

Jun. 22, 2018   (DK) .................................. 2018 70429

(51) Int. Cl.
*F03D 80/70*    (2016.01)
*F01M 1/20*    (2006.01)
(Continued)

(52) U.S. Cl.
CPC .............. *F03D 80/70* (2016.05); *F01M 1/20* (2013.01); *F03D 9/25* (2016.05); *F16N 29/02* (2013.01);
(Continued)

(58) Field of Classification Search
CPC .. F03D 80/70; F03D 9/25; F01M 1/20; F16N 29/02; F16N 2210/025; F05B 2240/50; F05B 2260/98; Y02E 10/72
See application file for complete search history.

(56) References Cited

U.S. PATENT DOCUMENTS 4,037,687 A * 7/1977 Krutz .................. F16H 57/0434
184/6.4
2010/0032959 A1* 2/2010 Nies .......................... F03D 9/17
416/174
(Continued)

FOREIGN PATENT DOCUMENTS

CN    202001688 U    10/2011
CN    104093972 A    10/2014
(Continued)

OTHER PUBLICATIONS

China National Intellectual Property Administration, First Notification of Office Action in CN Application No. 201980038752.8, dated Jul. 27, 2021.
(Continued)

*Primary Examiner* — Michael A Riegelman
(74) *Attorney, Agent, or Firm* — Wood Herron & Evans LLP (57) ABSTRACT

A fluid system for a wind turbine, which is particularly beneficial when the wind turbine is operating at low power, such as during idling operational mode. Fluid accumulates in a fluid storage device before being released intermittently, for example by fluid bursts or pulses, to one or more consumer units, including but not limited to bearings. The fluid system advantageously enables fluid, such as lubricant, to be sufficiently distributed to the one or more consuming units even if the pump used to supply fluid to the consuming units is operating at low power.

17 Claims, 4 Drawing Sheets

(51) Int. Cl.
*F03D 9/25* (2016.01)
*F16N 29/02* (2006.01)

(52) U.S. Cl.
CPC ....... *F05B 2240/50* (2013.01); *F05B 2260/98* (2013.01); *F16N 2210/025* (2013.01)

(56) References Cited

U.S. PATENT DOCUMENTS

| | | | | |
|---|---|---|---|---|
| 2011/0168495 A1* | 7/2011 | Subramaniam | ......... | F03D 80/70 184/6.12 |
| 2012/0211307 A1* | 8/2012 | Nielsen | ................. | F03D 80/70 184/4 |
| 2013/0113454 A1* | 5/2013 | Chen | ......................... | G05F 1/56 323/312 |
| 2013/0133454 A1* | 5/2013 | Barthel | ................. | F03D 80/70 74/468 |
| 2014/0054893 A1* | 2/2014 | Lindholdt | ............. | F03D 7/0276 290/44 |
| 2014/0062088 A1* | 3/2014 | Carr | ....................... | F03D 9/008 290/55 |
| 2021/0270249 A1* | 9/2021 | Pedersen | ................. | F03D 80/70 |

FOREIGN PATENT DOCUMENTS

| | | |
|---|---|---|
| EP | 2891795 A2 | 7/2015 |
| EP | 3293368 A1 | 3/2018 |
| WO | 2013136056 A1 | 9/2013 |

OTHER PUBLICATIONS

European Patent Office, International Search Report and Written Opinion in PCT Application No. PCT/DK2019/050171, dated Aug. 28, 2019.

Danish Patent and Trademark Office, Search and Examination Report in PA 2018 70429, dated Jan. 8, 2019.

* cited by examiner

FLUID SYSTEM FOR A WIND TURBINE

FIELD OF THE INVENTION

The invention relates to a fluid system for a wind turbine, in particular but not exclusively to a lubrication system.

BACKGROUND OF THE INVENTION

Wind turbine generators are complex electromechanical systems whose principal function is to convert energy in a flow of wind to electrical energy that can be transmitted to an electrical distribution grid. The main power generating function of a wind turbine is supported by several auxiliary systems which must be kept functional in order for the wind turbine to operate within acceptable parameters. Wind turbine auxiliary systems are generally powered either by a direct mechanical connection to the main rotating drive shaft of the wind turbine, or by way of an electrical grid connection that provides electrical power to that auxiliary system. One example of this is a lubrication system, the role of which is to supply lubricating fluid to the various fluid consumer units of the wind turbine. Examples of such consumer units may be the main bearing(s), gearbox bearings, the gearbox housing, and generator bearings, to name a few examples.

One problem occurs when the wind turbine is disconnected from the grid, during a grid fault for example, in which circumstances the auxiliary systems may not be provided with a sufficient source of power. In the lubrication system example discussed above, a grid disconnection may mean that an electrically driven lubrication pump no longer has a source of power. If the lubrication pump is mechanically driven, then the idling wind turbine may not provide sufficient rotational speed to generate adequate fluid flow in the lubrication system to pressurise the entire lubrication distribution system and lubricate all of the consumer units via their lubrication points. This compromises the effectiveness of the lubrication system when a grid disconnection occurs.

Although a backup power solution may be provided, for example in the manner of a diesel generator or battery pack, this will introduce complexity and may not provide availability of backup power for extended periods.

It is against this background that the embodiments of the invention have been devised.

SUMMARY

According to an aspect of the present invention, there is presented a fluid system for a wind turbine, configured to supply lubrication to one or more consumer units. The fluid system includes a fluid storage device configured to receive fluid from a pump. The pump has a normal operation mode in which it operates at a first speed and a low power operation mode at which it runs at a second speed that is lower than the first speed. The low power operation mode may occur when the wind turbine is in an idle condition in which it is not outputting power to an associated electrical grid. The fluid system also includes a fluid release system that is configured to operate when the pump is operating in the low power operation mode to release fluid intermittently from the fluid storage device to the one or more consumer units.

The fluid system advantageously enables fluid to be distributed sufficiently to consuming units, such as main bearing(s), gearbox bearings and gearbox housing(s), even when a pump of the fluid system is operating at low power. The pump may for example be operating at low power when it is not connected to an electrical grid, such as during idling.

The fluid system may be configured such that the release of fluid by the fluid release system is dependent on fluid pressure in the fluid storage device.

Since fluid from the fluid storage device is released at an adequate pressure level, this ensures that fluid is able to reach most of or all of the consumer units in the fluid circuit. In this way, the consumer units may receive bursts or pulses of fluid and the risk that some consumer units being starved of lubricating fluid is avoided.

The fluid system may be configured such that the release of fluid by the fluid release system is dependent on hysteresis means. Beneficially, the hysteresis means ensures that the bursts of fluid contain or deliver a sufficient quantity of fluid such that, ideally, all of the consumer units in the fluid circuit receive a sufficient fluid supply.

The hysteresis means may be configured such that fluid is released from the fluid storage device to the consumer units when the fluid pressure reaches a first pressure threshold.

The fluid system may be configured such that the hysteresis means is configured to prevent fluid being released from the fluid storage device to the consumer units when the fluid pressure reaches a second pressure threshold. The second pressure threshold may be lower than the first threshold. Those pressure thresholds may be adjustable by suitable configuration of the components that influence the pressure thresholds.

Having an adjustable pressure threshold means the fluid pressure can be tailored to the apparatus. For example, a large turbine with consumer units far apart from each other may require a higher volume of fluid to be released, possibly at a higher pressure, than a smaller turbine with consumer units close to each other, for the fluid to be sufficiently distributed. Different consumer units may also require fluid to be supplied at different pressure levels to operate effectively.

The fluid system may be configured such that the one or more consumer units are configured to receive lubrication fluid and may comprise at least one of: a main bearing, a gearbox bearing, a gearbox housing and a generator bearing.

The fluid system may be configured such that the fluid storage device is an accumulator.

The fluid system may be configured such that the fluid release system comprises an electronically controlled valve.

The fluid system may be configured such that the fluid release system is a mechanically implemented fluid release device. Advantageously, a mechanically implemented fluid release device means a separate power connection is not required for the control system of the device. Furthermore, a backup power system is not needed in case power is lost, as would be required by an electronically controlled fluid release system.

In a further aspect of the invention there is provided a wind turbine comprising a tower, a nacelle mounted to the tower and a hub connected to a plurality of wind turbine blades, wherein the hub is mounted to a main rotor arrangement, further comprising a plurality of consumer units configured to be supplied with fluid by the fluid system.

BRIEF DESCRIPTION OF THE DRAWINGS

Embodiments of the present invention will now be described in detail with references to the accompanying drawings, in which.

DETAILED DESCRIPTION

The embodiments of the invention relate to a fluid system for a wind turbine, in particular to aspects of how that fluid system operates when the power supplied to auxiliary systems of the wind turbine is reduced and/or limited. As will be described in more detail later, the invention advantageously enables consumer units to be supplied with sufficient fluid for effective operation when a pump of the fluid system is operating at low power. It should be noted at this point that the fluid system has particular application to a lubrication system, although the same principle may also be applied to other fluid systems within the wind turbine. For example, the principle may be applied to a pitch system. By providing pressurised hydraulic oil to load accumulators, pitching can be carried out without an electrical grid connection. This may advantageously avoid blade vibrations.

Figure 1:
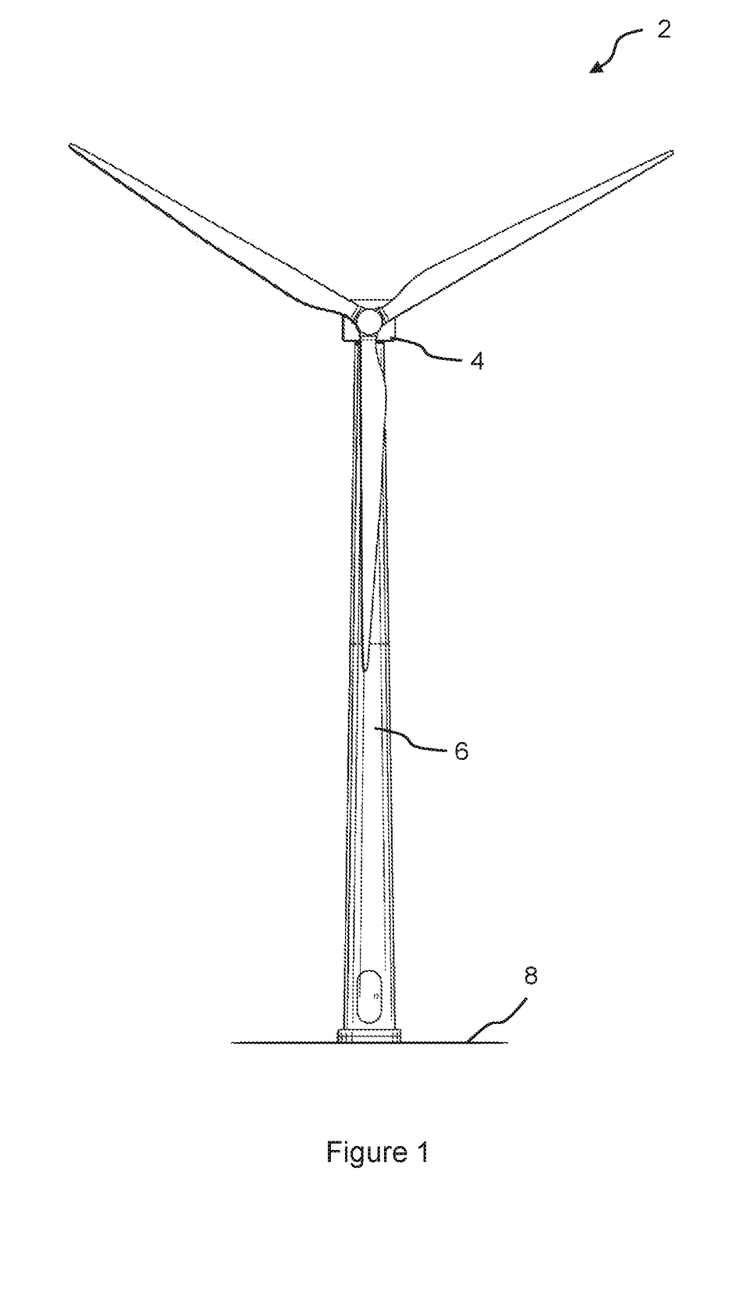
FIG. 1 is a front view of a wind turbine in which embodiments of the invention may be incorporated.
Figure 2:
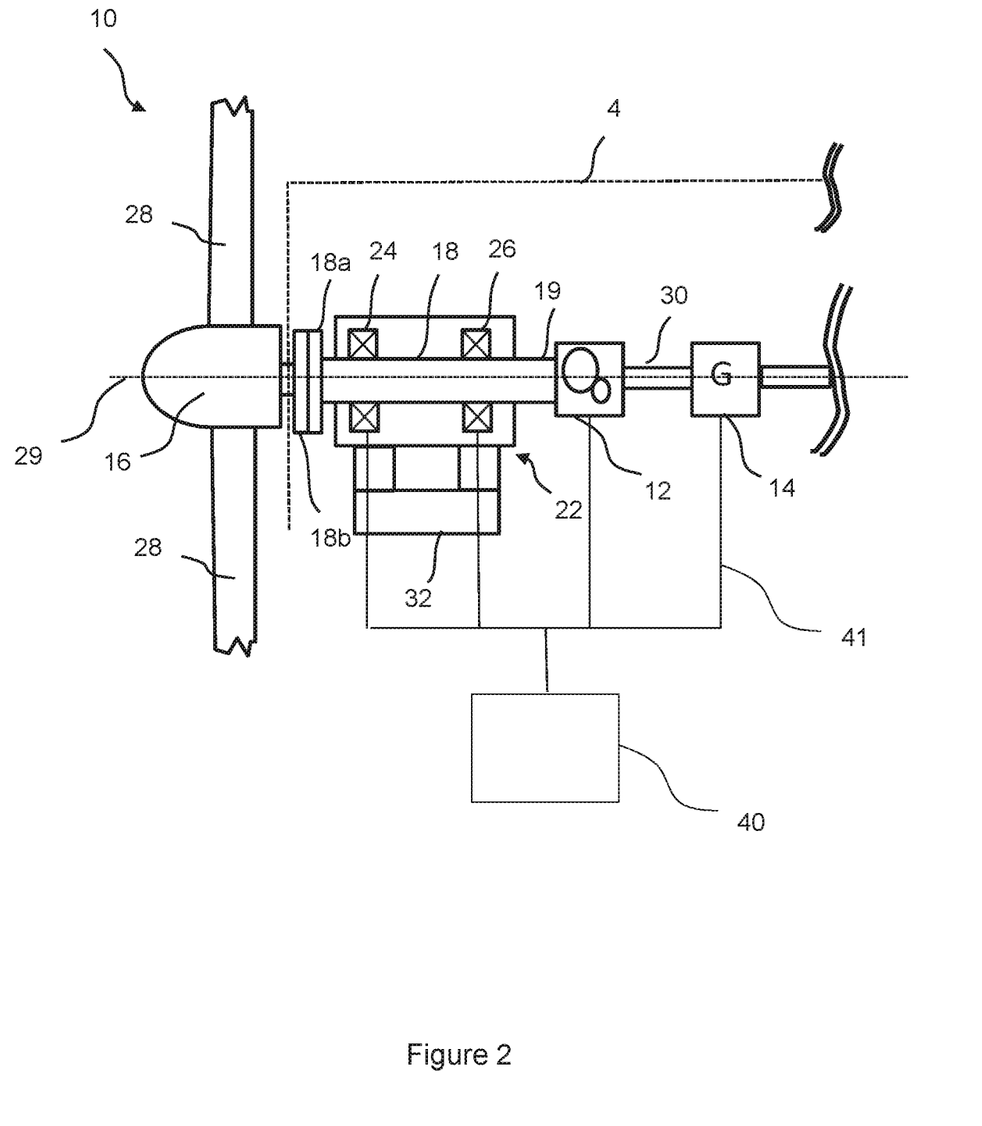
FIG. 2 is a schematic view of a drivetrain of the wind turbine of FIG. 1, including a lubrication system in accordance with an embodiment of the invention.

With reference to FIG. 1, a wind turbine 2 includes a nacelle 4 that is supported on a generally vertical tower 6, which is itself mounted to a foundation 8. The foundation 8 may be on the land, or wholly or partially underwater. The nacelle 4 houses a number of functional components, some of which are shown in FIG. 2, by way of example. Such a configuration would be well known to the skilled person. The skilled person will also appreciate that the architecture illustrated here is intended to be exemplary and other architectures are known and will be applicable to the inventive concept.

FIG. 2 illustrates the nacelle 4 which houses, at least in part, the main rotor arrangement 10, a gearbox 12 and a generator 14. For brevity, some typical components have been omitted from FIG. 2 as they are not central to this discussion, for example a power converter and yaw drive. However, the presence of such components is implicit and would be well understood by the skilled reader.

The main rotor arrangement 10 includes a hub 16 coupled to a main rotor shaft 18, which is rotatably supported in a main shaft housing 20 by a bearing arrangement 22. The main shaft housing is sometimes referred to in the art as a 'main bearing housing'. The bearing arrangement 22 may for example comprise a forward bearing 24 and a rear bearing 26. The hub 16 is connected to a plurality of rotor blades 28, although three blades are typical in a Horizontal Axis Wind Turbine (HAWT). The blades 28 are acted on by the wind and therefore torque is applied by the hub 16 to the main rotor shaft 18 which causes it to rotate within the main bearing housing 20.

An input or 'forward' portion of the main rotor shaft 18 comprises a flange 18a, by which means the main rotor shaft 18 is connected to, and driven by, the hub 16. Here the flange 18a is shown as being connected to a further flange 18b that is associated with the hub 16, such that the two flanges form a coupling between the hub 16 and the main rotor shaft 18. The flange 18a can therefore be considered to be at the hub-connection end of the main rotor shaft 18.

An output portion 19 of the shaft 18 provides input drive to the gearbox 12. The gearbox 12 steps up the rotational speed of the main rotor shaft 18 via internal gears (not shown) and drives a high-speed gearbox output shaft 28. The high-speed output shaft 28 in turn drives the generator 14, which converts the rotation of the high-speed output shaft 28 into electricity. The electrical energy generated by the generator 14 may then be converted by other components (not shown here) as required before being supplied to the grid, for example. So-called "direct drive" wind turbines that do not use gearboxes are also known.

The main bearing housing 20 is supported on a base frame 32, which can also be known as a bed plate. Although not shown here, the base frame 32 may be coupled to a yaw drive at the upper part of the wind turbine tower 6 to enable the base frame 32 and, thus, the entire nacelle 4 to yaw with respect to the tower 6 so as to enable the direction of the hub 16 to be adjusted with respect to the wind direction.

The base frame 32 is typically a cast component, for example of steel or iron, and has the function to transfer the main shaft loads from the shaft 18, through the bearings 24, 26, the main bearing housing, and the base frame 32, and into the wind turbine tower 6.

Figure 3:
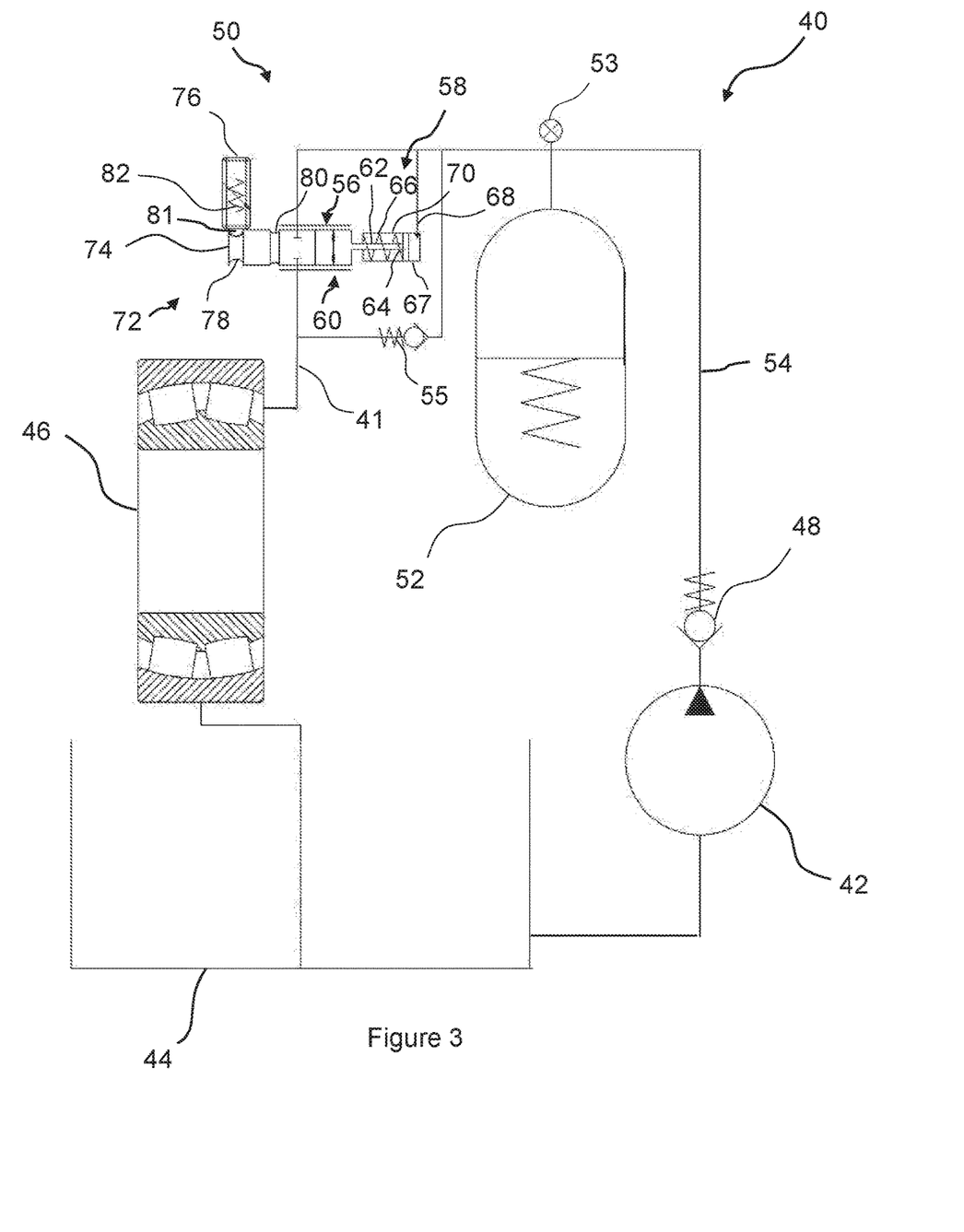
FIG. 3 is a schematic view which shows the lubrication system in FIG. 2 in more detail.

Having described the general system architecture of the wind turbine, the discussion will now focus on a fluid system 40 of the wind turbine which is indicated schematically in FIG. 2 as '40', and in more detail in FIG. 3. In the illustrated embodiment, the fluid system 40 is a lubrication system of the wind turbine that is configured to supply lubrication fluid to multiple components of the main rotor arrangement 10 via a fluid supply line or 'fluid circuit' 41. These multiple components of the main rotor arrangement 10, namely the support bearings 24 and 26, the gearbox 12 and the generator 14, represent examples of consumer units 46, which may receive lubricant from the fluid system 40. The consumer units 46 mentioned here are just examples, and the fluid system 40 may be configured to provide lubricant to other/ multiple components of the wind turbine. Furthermore, it should be appreciated that each consumer unit may include one or more lubrication points that must be supplied with lubrication fluid. For example, a gearbox housing may have several lubrication points. Therefore, in this discussion the term "consumer unit" should be understood as comprising one or more "consumer points" or "lubrication points".

FIG. 3 illustrates schematically an example of how the fluid system 40 may be configured to achieve the required functionality. As has been mentioned, the fluid system 40 is a lubrication system that is configured to lubricate a plurality of consumer units 46 of the wind turbine 2. Such consumer units 46 may be any devices that require lubrication, such as a main bearing, the gearbox 12 and bearings in the electric generator. Whilst the wind turbine 2 is operating normally, the lubrication system is operable to supply the consumer units 46 with a sufficient supply of lubricating fluid to ensure that mechanical wear of those components is minimised. However, a benefit of the invention is that it is also able to supply sufficient lubricant fluid flow and pressure to charge the fluid circuit 41 and reach all the relevant consumer units 46 when the primary power to the lubrication system has been removed and/or the lubrication system is running at limited capacity (flow). Such a situation may occur where: the lubrication system is electrically powered and the primary electrical power to that system is removed or, the lubrication is mechanically driven by a connection to the main shaft, and the wind turbine 2 is set into an idle mode. To this end, advantageously the fluid system 40 is configured to provide intermittent bursts or pulses of fluid at sufficiently high pressure, when the auxiliary system of the wind turbine 2 (e.g. the lubrication pump) is operating at low power, such as during idling (i.e. when the system is not connected to the electronic grid). This is in contrast to existing systems that may receive a constant flow of fluid at a low pressure and at a volumetric flow rate that is insufficient for the requirements of the consumer units 46 when the auxiliary system of the wind turbine is operating at low power.

Returning to FIG. 3, the fluid system 40 comprises a pump 42 that draws fluid from a suitable reservoir, tank or sump 44, pressurises that fluid and provides it to a fluid consumer, which in FIG. 2 is illustrated as '46' and depicts a bearing, for example the main bearing of the wind turbine 2. Any type of pump 42 may be used that is appropriate for pumping a suitable fluid for the application in question, which is lubricating fluid in the illustrated embodiment. For example, the pump 42 may be a vane pump, a piston pump, a progressive cavity pump or a gear pump.

To ensure that fluid is not able to flow back into the pump 42, a check valve 48 or similar component may be provided which allows fluid to pass through in one direction only.

The fluid system 40 further comprises a fluid release device 50 and a fluid storage device 52 that are connected to the pump 42 by a fluid pipe or line 54. The fluid release device 50 is configured to control the release of pressurised fluid generated by the pump 42 and stored in the fluid storage device 52

The fluid storage device 52 may for example be an accumulator including but not limited to a weight-loaded piston type, diaphragm (or bladder) type, spring type and a hydro-pneumatic type. As the fluid storage device 52 accumulates fluid, the pressure of the fluid increases within it.

The pump 42 is configured to operate in at lest two different modes of operation. Firstly, the pump 42 operates in a normal operation mode when the wind turbine is functioning normally, that is to say when the wind turbine is connected to an electrical grid and supplying power to it. In this normal operation mode, the pump 42 runs at its normal speed, which may be a normal speed range or interval, and not a single specific speed, depending on the configuration of the pump. The pump 42 is also configured to operate in a second operational mode, and this may apply when the wind turbine is offline, that is when the wind turbine is disconnected from the grid and idling. In such circumstances, the pump 42 is operating at low power whether it is mechanically driven or electrically driven, as is discussed here. As such, the second operation mode may be referred to as a low power operation mode, and will operate at a speed or speed range which is lower than the speed or speed range in which the pump will operate when in the normal operation mode.

During circumstances when the pump is operating in a low power operation mode, the fluid release device 50 is configured to release pressurised fluid to the consumer units 46 intermittently, that is to say at regular or irregular intervals. The intermittent release of fluid may take the form of pulses or short bursts. As such, the fluid release device 50 releases fluid to the consumer units 46 only when sufficient volume has been stored and hence pressure built in the fluid storage device 52. During a low power scenario, when the pump 42 is running more slowly than during normal operation, the pump 42 will gradually build up fluid pressure in the fluid storage device 52. At certain intervals, the fluid release device 50 operates to release that pressurised fluid from the fluid storage device 52 and supply it to the consumer units 46. In this way, the consumer units 46 are supplied with high pressure fluid which is at a sufficient pressure to be supplied throughout the network of consumer units 46 so that they all are able to be lubricated sufficiently. Even though the supply of fluid is intermittent, importantly the fluid is at a relatively high pressure so that it will reach all of the consumer units 46 in order to supply them with lubrication. The level of lubrication may not be equal to what those consumer units 46 would receive in normal operation, but it will be acceptable to ensure that wear or corrosion isn't accelerated.

The intermittent release of fluid by the fluid release device 50 may be achieved in various ways. In one embodiment, an electronically controlled valve (not shown) may be configured to release fluid at predetermined intervals. Those predetermined intervals may be set based on the known operation of how long it takes the pump 42 to generate sufficient pressure within the fluid storage device 52.

The timing internal between the intermittent bursts may be configurable depending on the lubrication requirements of the system. However, the timing interval of the fluid release device 50 should be such that fluid pressure reaches a sufficiently high level so that lubrication fluid travels to preferably all of the consumer units. The precise time between burst depends on the nature of the consumer units, and so the system is configurable so that it can be tuned appropriately. Generally, it is envisaged that the time interval between bursts will be between 1 minute and 24 hours. An upper limit of 24 hours would ensure that consumer units receive at least some lubrication. Preferably, however, the burst would be more frequent than a single burst every 24 hours.

In an alternative embodiment, the electronically controlled valve may be equipped with suitable sensing means to sense the pressure of fluid within the fluid storage device 52. The electronically controlled valve may then be operable in dependence on the sensed pressure to release fluid to the consumer units 46 only when a predetermined pressure threshold has been reached. For example, the pressure within the system may be sensed by a suitably-positioned pressure tap/sensor 53.

In this context, the electronically controlled valve may be implemented with a suitable hysteresis function to ensure that the valve is not closed too rapidly once the predetermined pressure threshold has been reached, following which the pressure in the fluid storage device 52 would drop rapidly. In this way, such a hysteresis function would ensure that a sufficiently long burst of fluid is delivered.

The hysteresis function could be implemented in the form of an electronic timer in dependence on which the electronically controlled valve would be operable to remain open for a predetermined period of time after the valve has been triggered to open, that is, once the pressure threshold has been reached.

Alternatively, the hysteresis function could be implemented so that the electronically controlled valve would remain open after being triggered until the pressure level in the fluid storage device 52 has dropped to and so reaches a second, lower, pressure threshold.

Although the fluid release device 50 may be implemented as an electronically controlled valve, as discussed above, this would require a separate power connection for the control system of the device. It would be appreciated that such a system would need a backup power supply in the event that power was lost, and the control system would need to be designed to be extremely reliable to ensure that the lubrication system does not fail.

A purely mechanical system may therefore be desirable in some circumstances. An example of a mechanical implementation of a fluid release device 50 is shown in FIG. 3 and will now be described below in more detail.

The fluid release device 50 in the illustrated embodiment comprises a one-way two-position control valve 56 that is connected to the fluid line 54. In a first position, as is shown in FIG. 3, the control valve 56 blocks the flow of fluid from the fluid line 54 to the consumer units 46, and at a second position, the control valve 56 permits fluid to flow. Here, the control valve 56 is depicted as a spool valve, but this is just exemplary and is the conventional way to illustrate such valves schematically.

The control valve 56 is operable in dependence on the pressure of fluid in the fluid line 54 and, to this end, includes a mechanical control arrangement 58. As will be apparent, the control arrangement 58 is operable to trigger the control valve 56 to open at a predetermined pressure.

The position of the control valve 56 is controlled by a pressure-activated linear actuator 60 comprising a push rod 62 that is connected to a piston 64, at its distal end, which is slidable within a cylinder 66. A control chamber 67 is therefore defined between the end of the cylinder 66 and the piston 64.

The end of the cylinder 66 includes a fluid connection 68 to the fluid line 54 so that the control chamber is exposed to pressurised fluid that is at the same pressure as fluid in the fluid storage device 52. The cylinder 66 houses a valve spring 70 which exerts a force on the piston 64 so as to bias the control valve 56 into the closed position—this is the position shown in FIG. 3. The movement of the push rod 62 and, thus, the control valve 56 is therefore determined by the force applied to the piston 64 by the valve spring 70, and the opposing force applied to the piston 64 by pressurised fluid in the control chamber 67. Therefore, once the pressure of fluid in the control chamber exerts a force on the piston 64 that is greater than the opposing force exerted by the valve spring 70, the control valve 56 will try to open.

However, to ensure that the control valve 56 opens and closes sharply in order to achieve the intermittent burst of fluid, the control arrangement 60 also includes a hysteresis unit 72. In overview, the hysteresis unit 72 is responsible for controlling the start and end of fluid delivery. In other words, the hysteresis unit sets a delivery interval for the fluid delivery. In this way, the hysteresis unit 72 ensures that a significant volume of fluid is delivered by preventing possible 'flutter' of the control valve as the fluid pressure fluctuates during opening of the control valve 56. The hysteresis unit 72 may be configurable to set the separation between the start and end of fluid delivery and, moreover, may be adjustable to permit the delivery interval to be varied. The hysteresis unit 72 may conceivably be embodied as a time-operable switch which allows the control valve to open for a pre-determined period. Alternatively, the hysteresis may be responsive to the pressure of fluid in the fluid storage device. Naturally, the volume of fluid that is required to be delivered and the time in which it should be delivered may change based on the specific application. However, to put the invention into context, currently it is envisaged that the volume of fluid to be delivered would be between 1 litre and 20 litres and that typically the delivery internal will be a maximum of 10 seconds, such as maximum 30 seconds. A practical delivery rate for the current application is envisaged to be 0.5 litres per minute, although it should be noted that this value is provided merely by way of example.

In the illustrated embodiment the hysteresis unit 72 comprises a shaft 74 that is a continuation of the spool of the control valve 56 and a releasable locking unit 76 that is configured to releasably lock the control valve 56 into either of the first and second positions by either engaging or disengaging the shaft 74. As can be seen, the shaft 74 includes two annular grooves 78, 80 which are in displaced positions along the axial direction of the shaft 74. The releasable locking unit 76 includes a spring-loaded locking element 81 which is configured to engage with either of the two grooves 78, 80 depending on the position of the shaft 74. Here, the locking member 81 is depicted as a ball that is biased into engagement with the shaft 74 by a spring 82.

It will be appreciated that as the pressure in the control chamber 67 of the control valve 56 builds to a sufficient level, the locking element 81 will hold the control valve 56 in the closed position to ensure that the control valve 56 does not start to move slowly into the open position. However, at a predetermined upper pressure threshold, the force exerted by the fluid pressure in the control chamber 67 will be sufficient to overcome the opposing force of the valve spring 70 but will also be sufficient to drive the locking element 81 out of the first groove 78. The control valve 56 will then open which will drive the shaft 74 to the left, as illustrated in FIG. 3, such that the locking element 81 then engages with the second groove 80. This will lock the control valve 56 in the open position such that fluid flows to the consumer units 46 at a pressure equal to a first or 'upper' pressure threshold. The pressure threshold is therefore largely determined by the spring constant of the spring 82 that holds the locking element 81 in position in the first groove 78, the spring constant of the valve spring 70, the dimension of the ball-shaped locking element 81 and the dimension of the first groove 78. Note that the first groove 78 may also be referred to as the 'opening groove'.

It will be appreciated that as the control valve 56 is open, the pressure of fluid in the fluid storage device 52 and, thus, the fluid line 54 starts to decrease rapidly. However, since the locking element 81 is engaged in the second groove 80, the control valve 56 is prevented from shutting immediately. The second groove 80 may therefore also be referred to as the 'closing groove'.

The control valve 56 therefore stays open until the pressure drops to or below a second or 'lower' pressure threshold. This lower threshold is determined by the force required to move the locking element 81 out of the closing groove 78, which is therefore dependent on the strength of the spring 82, the valve spring 70, the dimension of the closing groove 78 and the dimension of the ball-shaped locking element 81.

Once fluid pressure drops below the lower pressure threshold, the restoring force applied by the valve spring 70 on the piston 64 is sufficient to dislodge the locking element 81 from the closing groove. The shaft 74 therefore moves in a closing direction, to the right as shown in FIG. 3, such that the locking member 80 moves from the closing groove 78 to the opening groove 80. The control valve 56 is thereby closed, shutting off the fluid flow to the consumer units 46.

From the above discussion, it will be appreciated that the control valve 56 and the control arrangement 60 act mechanically to provide sharp bursts of pressurised fluid intermittently to the consumer units 46. Furthermore, it will be noted that the pressure that is supplied to the consumer units 46, and the length of time for which fluid is delivered, is dependent on the upper and lower pressure thresholds and the size of the accumulator 52. The upper and lower pressure thresholds can be configured by tuning the size of the valve spring 70 in the control arrangement 60 and the spring 82 in the hysteresis unit 72, the size of the piston 64, and also the size of the opening groove 80 and the closing groove 78.

Although these variables may be configured at the manufacturing stage, it is possible to include some adjustability in the system. For example, the hysteresis unit 72 may be configured so that the pre-load on the locking spring 82 is adjustable which would adjust the force required to dislodge the locking element 81 from the opening and closing grooves. Such adjustability could be useful if it is required to fine-tune the delivery of the lubricant throughout the fluid circuit 41.

From the above discussion it will be appreciated how the control valve 56 activates intermittently when the wind turbine is operating in a reduced capability mode such that the pump 42 is operating more slowly than usual, that is, in the low power operation mode', as discussed above. However, it should also be noted that during normal operation of the pump 42, the fluid pressure generated in the system is always high so that the control valve 56 remains open and does not otherwise influence the supply of fluid to the consumer units 46. The accumulator 52 will furthermore extend the time the fluid circuit 41 will stay pressurised after the pump 42 stops producing flow if the primary electrical power is removed/reduced. This may add additional protection to lubricated components that are especially sensitive to a lack of lubricant supply (flow pressure), such as a journal bearing.

The fluid system 40 may further comprise a safety bypass valve 55. The safety bypass valve 55 may for example comprise a check valve 48, as illustrated in FIG. 3. The safety bypass valve 55 may be configured to open at a safety pressure threshold (higher than the upper pressure threshold), such that when the fluid pressure is at or above the safety pressure threshold, the safety bypass valve 55 opens and becomes the path of least resistance for the fluid to flow through. In the event of a malfunction of the hysteresis unit 72, the bypass valve 55 may therefore operate to avoid equipment such as the control chamber, accumulator, pump, control valve 56 and locking element 81 in the illustrative embodiment, being damaged by pressures that exceed their design limits.

The operation of the fluid system 40 may be cyclical, such that fluid repeatedly accumulates in the fluid storage device 52 and is released intermittently. Excess fluid discarded by the consumer units 46 may for example collect in the tank 44, before being pumped into the fluid storage device 52 as part of another cycle of the fluid system 40.

FIG. 3 may include additional components that are not shown in the diagram but are naturally affiliated with a lubrication system, such as a heat exchanger and lubricant filters. The skilled person will appreciate the benefit of placing the lubricant filters after the pump, but before the accumulator. This is done to reduce the flow resistance to be overcome during a flow release, and to limit particles released from the filters.

Figure 4:
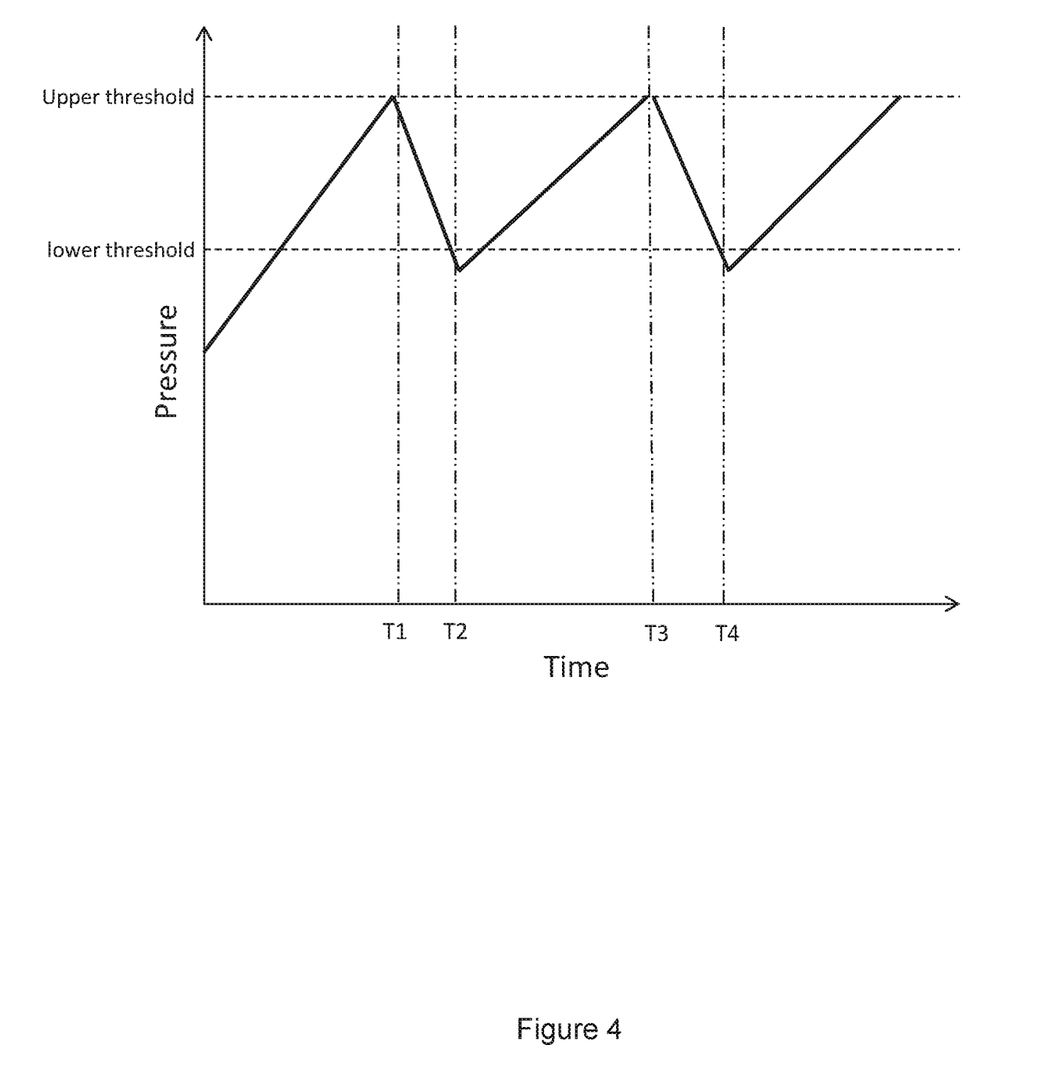
FIG. 4 is a graph that depicts the intermittent release of fluid by the fluid system of the embodiment of the invention in FIG. 3.

As a further illustration of the operation of the fluid release device 50, FIG. 4 illustrates, in the form of a graph, how the fluid pressure may, for example, vary over time during operation of the fluid system 40. The vertical dashed lines in FIG. 4 indicate stages of the fluid system 40 in operation for explanatory purposes.

Beginning from the left hand side of the graph in FIG. 4, the first vertical segment shows how the pressure of the fluid may rise as the fluid storage device 52 accumulates fluid. Although FIG. 4 shows the lowest pressure value being greater than zero, the initial pressure level may take any value, including zero. Upon the fluid pressure reaching the upper pressure threshold (T1 on FIG. 4), the control valve 56 opens, driving the shaft 74 to the left, such that the locking element 81 engages with the second groove 80. The control valve 56 is thereby locked in the open position. Fluid flows to the consumer units 46 and the pressure drops. Since the locking element 81 is engaged in the second groove 80, the control valve 56 is prevented from shutting immediately. Upon the fluid pressure reaching the lower pressure threshold (T2 in FIG. 4), the locking element 81 moves from the second groove 80 to the first groove 78 and the control valve 56 is closed. FIG. 4 shows a second cycle of the fluid system 40 with the fluid pressure again rising to the upper pressure threshold at T3, the control valve 56 opening and the pressure dropping. Upon the fluid pressure dropping again to the lower threshold at T4, the control valve 56 is closed and the cycle continues.

From the above discussion, it will be apparent that advantageously the fluid system 40 enables consumer units 46 to receive intermittent bursts of fluid at sufficiently high pressure, even when the auxiliary system of the wind turbine (e.g. the lubrication pump) is operating at low power, such as during idling. This is in contrast to existing systems that may receive a constant flow of fluid at a low pressure, when the auxiliary system of the wind turbine is operating at low power, which is insufficient for the requirements of the consumer units 46. For example, the fluid system 40 is able to deliver fluid to consumer units 46 at pressures sufficient to distribute fluid to specific or all distribution points required. The upper and/or lower pressure thresholds may be set such that fluid reaches some or all consumer units 46.

The skilled person will appreciate that the illustrated embodiments as discussed above may be varied without departing from the inventive concept as defined by the claims.

For example, although the illustrated embodiment includes a fluid accumulator which is shown as a specific device, e.g. a gas-filled pressure-vessel, for storing a significant volume of pressurised fluid, it should be noted that other accumulator arrangements may be possible to achieve the necessary functionality. For example, it may be possible to store sufficient pressure within the pipes of the fluid circuit and, in that sense, the pipe would still provide the functionality of 'accumulating' fluid at a raised pressure.

The skilled person will also appreciate that although the specific embodiment has been described as being a lubrication system for the wind turbine, the inventive concept may also be applicable to other fluid systems. For example, hydraulic or pneumatically-operated actuators could also be equipped with such a system in order that they may still be operated, at least with limited functionality, when the wind turbine is at an idle condition.

The invention claimed is:

1. A fluid system for a wind turbine, configured to supply fluid to a lubrication point of one or more consumer units, the fluid system including:
   a fluid storage device configured to receive fluid from a pump;
   wherein the pump has a normal operation mode in which it operates at a first speed and a low power operation mode at which it runs at a second speed that is lower than the first speed,
   a fluid release system configured to operate when the pump is operating in the low power operation mode to release fluid intermittently from the fluid storage device to the lubrication point of the one or more consumer units, wherein fluid is configured to flow from the fluid release system to the lubrication point of the one or more consumer units before flowing back through the pump.

2. The fluid system as claimed in claim 1, wherein the release of fluid by the fluid release system is dependent on fluid pressure in the fluid storage device.

3. The fluid system as claimed in claim 1, including hysteresis means configured to define a delivery interval of the fluid release system.

4. The fluid system as claimed in claim 3, wherein the hysteresis means is configured to permit the delivery interval to be adjusted.

5. The fluid system as claimed in claim 3, wherein the delivery interval is defined by an opening point and a closing point, and wherein the hysteresis means is configured to control the separation between the opening point and the closing point.

6. The fluid system as claimed in claim 3, wherein the hysteresis means is responsive to fluid pressure.

7. The fluid system of claim 6, wherein the hysteresis means is configured such that fluid is released from the fluid storage device to the lubrication point of the one or more consumer units when the fluid pressure reaches a first pressure threshold.

8. The fluid system as claimed in claim 7, wherein the hysteresis means is configured to prevent fluid being released from the fluid storage device to the lubrication point of the one or more consumer units when the fluid pressure reaches a second pressure threshold.

9. The fluid system as claimed in claim 3, wherein the delivery interval is less than thirty seconds.

10. The fluid system as claimed in claim 1, wherein the one or more consumer units are configured to receive lubrication fluid and may comprise at least one of: a main bearing, a gearbox bearing, a gearbox housing and a generator bearing.

11. The fluid system as claimed in claim 1, wherein the fluid storage device is an accumulator.

12. The fluid system as claimed in claim 1, wherein the fluid release system is a mechanically implemented fluid release device.

13. The fluid system as claimed in claim 1, wherein the fluid release system is configured to operate when the pump is operating in the low power operation mode to release fluid intermittently in bursts from the fluid storage device to the lubrication point of the one or more consumer units, where a time interval between bursts is between 1 minute and 24 hours.

14. The fluid system as claimed in claim 13, wherein the volume of fluid to be delivered in each burst is between 1 and 20 litres.

15. A wind turbine comprising a tower, a nacelle mounted to the tower and a hub connected to a plurality of wind turbine blades, wherein the hub is mounted to a main rotor arrangement, further comprising a plurality of consumer units configured to be supplied with fluid by the fluid system as claimed in claim 1.

16. The fluid system as claimed in claim 1, wherein the fluid release system is configured to operate to permit fluid to flow through the fluid release system to the lubrication point of the one or more consumer units during normal operation of the pump.

17. A fluid system for a wind turbine, configured to supply fluid to one or more consumer units, the fluid system including:
   a fluid storage device configured to receive fluid from a pump;
   wherein the pump has a normal operation mode in which it operates at a first speed and a low power operation mode at which it runs at a second speed that is lower than the first speed,
   a fluid release system configured to operate when the pump is operating in the low power operation mode to release fluid intermittently from the fluid storage device to the one or more consumer units; and
   a hysteresis means configured to define a delivery interval of the fluid release system, the hysteresis means being responsive to fluid pressure,
   wherein the hysteresis means is configured such that fluid is released from the fluid storage device to the consumer units when the fluid pressure reaches a first pressure threshold, and
   wherein the hysteresis means is configured to prevent fluid being released from the fluid storage device to the consumer units when the fluid pressure reaches a second pressure threshold.

* * * * *